US012029353B2

(12) United States Patent
Mock et al.

(10) Patent No.: US 12,029,353 B2
(45) Date of Patent: Jul. 9, 2024

(54) MIXING BOWL ASSEMBLY

(71) Applicant: WHIRLPOOL CORPORATION, Benton Harbor, MI (US)

(72) Inventors: Brandon Tyler Mock, St. Joseph, MI (US); John Jay Myers, Saugatuck, MI (US); Katie Remaly, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 581 days.

(21) Appl. No.: 17/352,710

(22) Filed: Jun. 21, 2021

(65) Prior Publication Data
US 2021/0393082 A1 Dec. 23, 2021

Related U.S. Application Data

(60) Provisional application No. 63/042,857, filed on Jun. 23, 2020.

(51) Int. Cl.
| | |
|---|---|
| *A47J 36/06* | (2006.01) |
| *A47J 36/34* | (2006.01) |
| *A47J 43/07* | (2006.01) |
| *A47J 45/06* | (2006.01) |

(52) U.S. Cl.
CPC .......... *A47J 43/0727* (2013.01); *A47J 36/06* (2013.01); *A47J 36/34* (2013.01); *A47J 43/0705* (2013.01); *A47J 45/062* (2013.01)

(58) Field of Classification Search
CPC .... A47J 43/04; A47J 43/0727; A47J 43/0705; A47J 36/06; A47J 36/34; A47J 45/062; B65D 2543/00351

USPC ............... 220/573.1, 912; 366/197
See application file for complete search history.

(56) References Cited

U.S. PATENT DOCUMENTS

| | | | | |
|---|---|---|---|---|
| 2,507,425 | A | * 5/1950 | Swartout ................. | A47J 47/02 220/592.28 |
| 4,165,855 | A | * 8/1979 | Mason, Jr. ............ | A47J 36/027 D7/672 |
| 4,705,163 | A | * 11/1987 | James ..................... | A47G 19/26 220/301 |
| 5,213,028 | A | 5/1993 | Chang | |
| 6,581,795 | B1 | 6/2003 | Schulein et al. | |
| 2006/0044935 | A1 | 3/2006 | Benelli et al. | |
| 2007/0095961 | A1 | 5/2007 | Lin et al. | |
| 2012/0003353 | A1 | 1/2012 | Lonergan | |

(Continued)

FOREIGN PATENT DOCUMENTS

| | | |
|---|---|---|
| DE | 102011078377 A1 | 1/2013 |
| EP | 1955626 A1 | 8/2008 |

(Continued)

*Primary Examiner* — John K Fristoe, Jr.
*Assistant Examiner* — Elizabeth J Volz
(74) *Attorney, Agent, or Firm* — Price Heneveld LLP

(57) ABSTRACT

A mixing bowl assembly includes a bowl that has handles extending outwardly from the bowl. A lid is selectively coupled to the bowl. The lid includes an outer circumferential frame and grasping portions that extend outwardly from the outer circumferential frame. A planar wooden trivet is selectively coupled with the lid, wherein the planar wooden trivet defines at least a servicing position of the lid. A glass dome is selectively coupled to the planar wooden trivet and includes a handgrip that is selectively disposed within the bowl.

20 Claims, 11 Drawing Sheets

(56) References Cited

U.S. PATENT DOCUMENTS

2013/0153572 A1* 6/2013 Gillette ................ B01F 35/511
                                                                220/793
2014/0246420 A1* 9/2014 Paget ...................... B01F 35/92
                                                                219/438

FOREIGN PATENT DOCUMENTS

| EP | 3485772 A1 | 5/2019 |
| FR | 2920658 A1 | 3/2009 |
| WO | 0213622 A2 | 2/2002 |
| WO | 2007002348 A1 | 1/2007 |

* cited by examiner

MIXING BOWL ASSEMBLY

CROSS REFERENCE TO RELATED APPLICATION

This application claims the benefit under 35 U.S.C. § 119(e) to U.S. Provisional Patent Application No. 63/042,857, filed Jun. 23, 2020, entitled "MIXING BOWL ASSEMBLY," which is incorporated herein by reference in its entirety.

BACKGROUND OF THE DISCLOSURE

The present disclosure generally relates to a mixing bowl assembly, and more specifically, to a bowl and a lid for a mixing bowl assembly.

SUMMARY OF THE DISCLOSURE

According to one aspect of the present disclosure, a mixing bowl assembly for an appliance includes a bowl that has at least one attachment feature and is configured to selectively couple to a body of said appliance via the at least one attachment feature. A lid is selectively and operably coupled to the bowl and includes an outer circumferential frame and an inner circumferential lip. The lid defines a depressed support surface that is proximate the inner circumferential lip. A planar wooden trivet has a perimeter rim that selectively engages the lid. The planar wooden trivet is selectively disposed on the depressed support surface of the lid in a serving position of the lid. A dome is selectively disposed within the bowl in a storage configuration. The dome is selectively coupled to the perimeter rim of the planar wooden trivet that is proximate the outer circumferential frame of the lid.

According to another aspect of the present disclosure, a mixing bowl assembly includes a bowl that has handles extending outwardly from the bowl. A lid is selectively coupled to the bowl. The lid includes an outer circumferential frame and grasping portions that extend outwardly from the outer circumferential frame. A planar trivet is selectively coupled with the lid, wherein the planar trivet defines at least a servicing position of the lid. A glass dome is selectively coupled to the planar trivet and includes a handgrip that is selectively disposed within the bowl.

According to yet another aspect of the present disclosure, a mixing bowl assembly includes a bowl, and a lid that is operably coupled to the bowl and has an outer circumferential frame and an inner circumferential lip. The lid defines a depressed support surface that is proximate the inner circumferential lip. The mixing bowl assembly further includes a planar wooden trivet that has a perimeter rim that engages the inner circumferential lip of the lid. The planar wooden trivet is selectively disposed on the depressed support surface of the lid. A glass dome is selectively disposed within the bowl and has a handgrip. The glass dome is selectively coupled to the perimeter rim of the planar wooden trivet that is proximate to the outer circumferential frame of the lid.

These and other features, advantages, and objects of the present disclosure will be further understood and appreciated by those skilled in the art by reference to the following specification, claims, and appended drawings.

Figure 1:
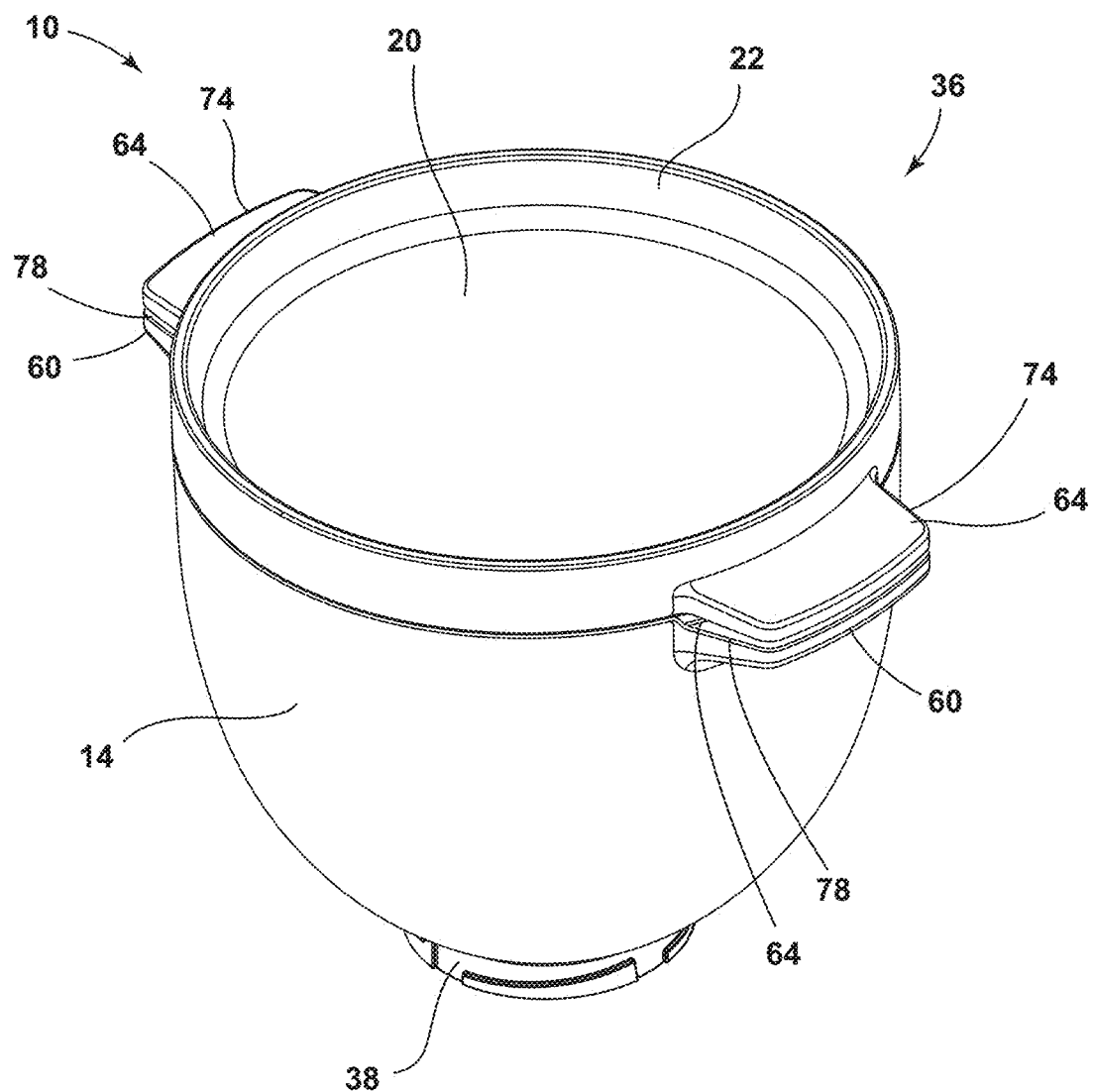
FIG. 1 is a top perspective view of a mixing bowl assembly of the present disclosure.
Figure 2:
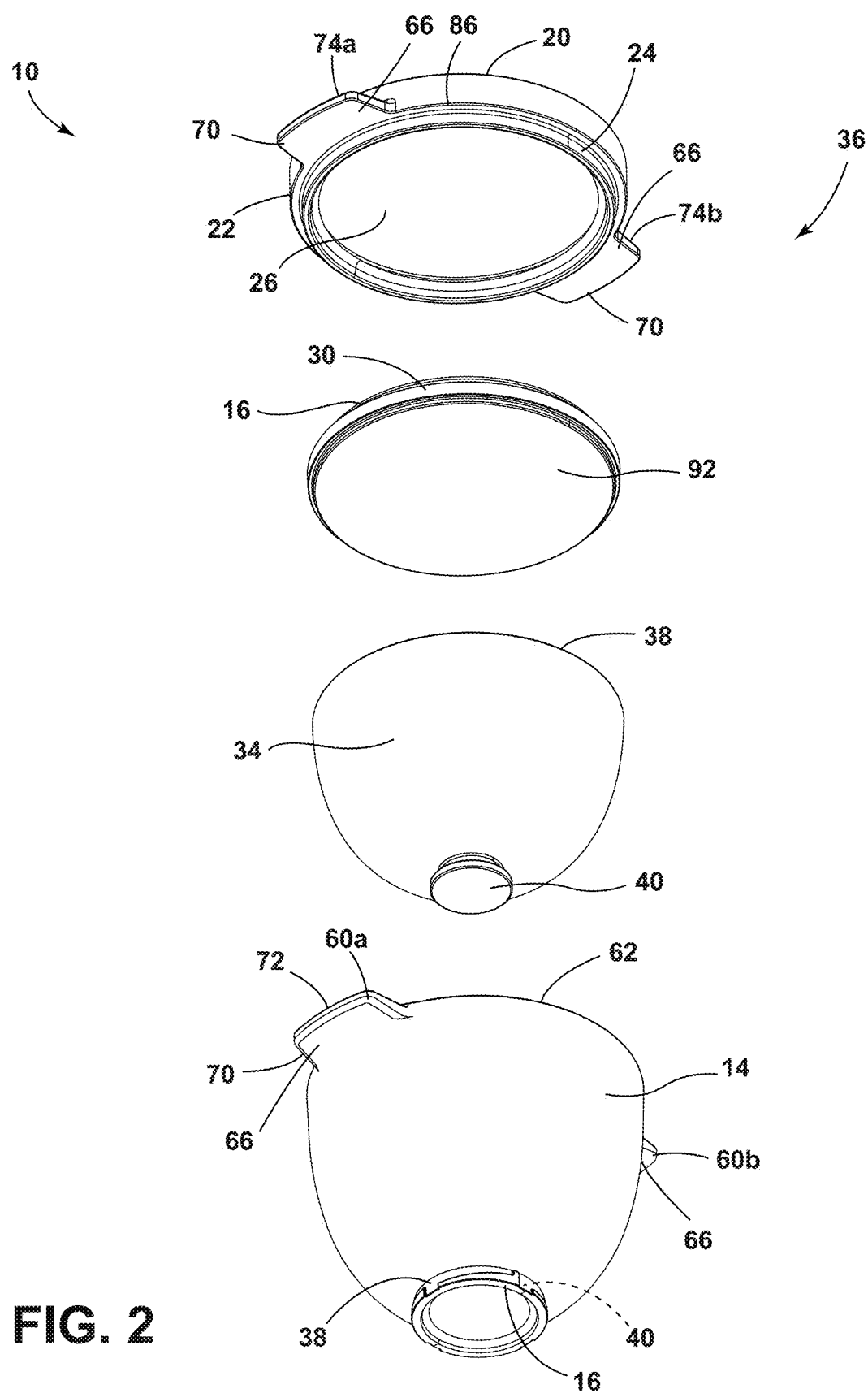
FIG. 2 is a bottom perspective exploded view of a mixing bowl assembly of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a mixing bowl assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-11, reference numeral 10 generally designates a mixing bowl assembly for an appliance 12. The mixing bowl assembly 10 includes a bowl 14 that has at least one attachment feature 16. The bowl 14 is configured to selectively couple to a body 18 of the appliance 12 via the at least one attachment feature 16. A lid 20 is selectively and operably coupled to the bowl 14 and includes an outer circumferential frame 22 and an inner circumferential lip 24. The lid 20 also defines a depressed support surface 26 proximate the inner circumferential lip 24. A planar wooden trivet 28 has a perimeter rim 30 that selectively engages the lid 20. The planar wooden trivet 28 is selectively disposed on the depressed support surface 26 of the lid 20 in a serving position 32 of the lid 20. A dome 34 is selectively disposed within the bowl 14 in a storage configuration 36. The dome 34 is selectively coupled to the perimeter rim 30 of the planar wooden trivet 28 proximate to the outer circumferential frame 22 of the lid 20.

Referring now to FIGS. 1-4, the mixing bowl assembly 10 may define the storage configuration 36 in which the dome 34 and the planar wooden trivet 28 are positioned within the bowl 14 and beneath the lid 20. Stated differently, the storage configuration 36 is a nested storage position in which the dome 34 and the planar wooden trivet 28 are disposed within the bowl 14. A base 38 of the bowl 14 may be recessed, such that a handgrip 40 of the dome 34 can be disposed within the recessed base 38 when in the nested storage position 36. It is also contemplated that the handgrip 40 may rest upon a bottom 42 of the bowl 14. The dome 34 is generally smaller than the bowl 14, such that the dome 34 is configured to fit within the bowl 14 in the nested storage position 36. The planar wooden trivet 28 can then be disposed on the dome 34, such that the perimeter rim 30 of the planar wooden trivet 28 rests on a circumferential edge 44 of the dome 34.

The storage configuration 36 can be completed with the depressed support surface 26 of the lid 20 being positioned proximate to the planar wooden trivet 28. In the nested storage position 36, the lid 20 is disposed over the planar wooden trivet 28 and is coupled to the bowl 14, such that the inner circumferential lip 24 of the lid 20 defines a mating engagement with the bowl 14, as described further below. The storage configuration 36 allows for the mixing bowl assembly 10 to be easily stored as well as to minimize the storage space for each of the dome 34 and the planar wooden trivet 28.

Figure 3:
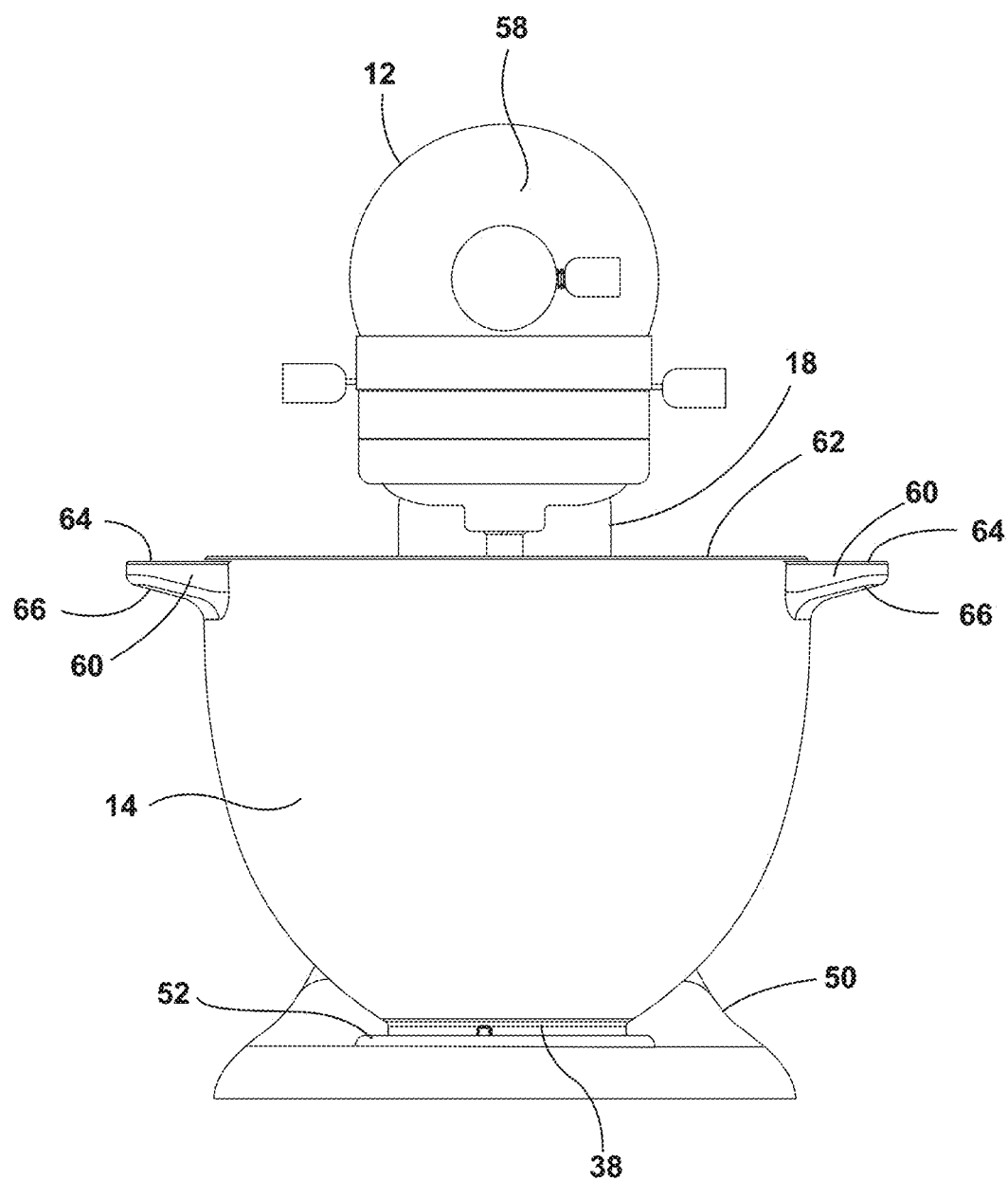
FIG. 3 is a front elevational view of a bowl of the present disclosure coupled to an appliance.

With reference now to FIGS. 2-6, the mixing bowl assembly 10 is configured to selectively engage with the appliance 12, mentioned above, and be selectively disposed within a cooking appliance 48 (FIG. 8), described in further detail below. By way of example, not limitation, the cooking appliance 48 (FIG. 8) is illustrated as an oven, and the appliance 12 is illustrated as a stand mixer. As illustrated in FIG. 3, the appliance 12 illustrated includes a pedestal 50 coupled to the body 18 of the appliance 12. The pedestal 50 defines an attachment portion 52. The attachment portion 52 may be magnetic, snap-fit, screw base, or have other methods of attaching the bowl 14 of the mixing bowl assembly 10. As illustrated in FIG. 1, the bowl 14 includes the at least one attachment feature 16 on a base 38 of the bowl 14, which is illustrated with a screw base configuration.

Figure 4:
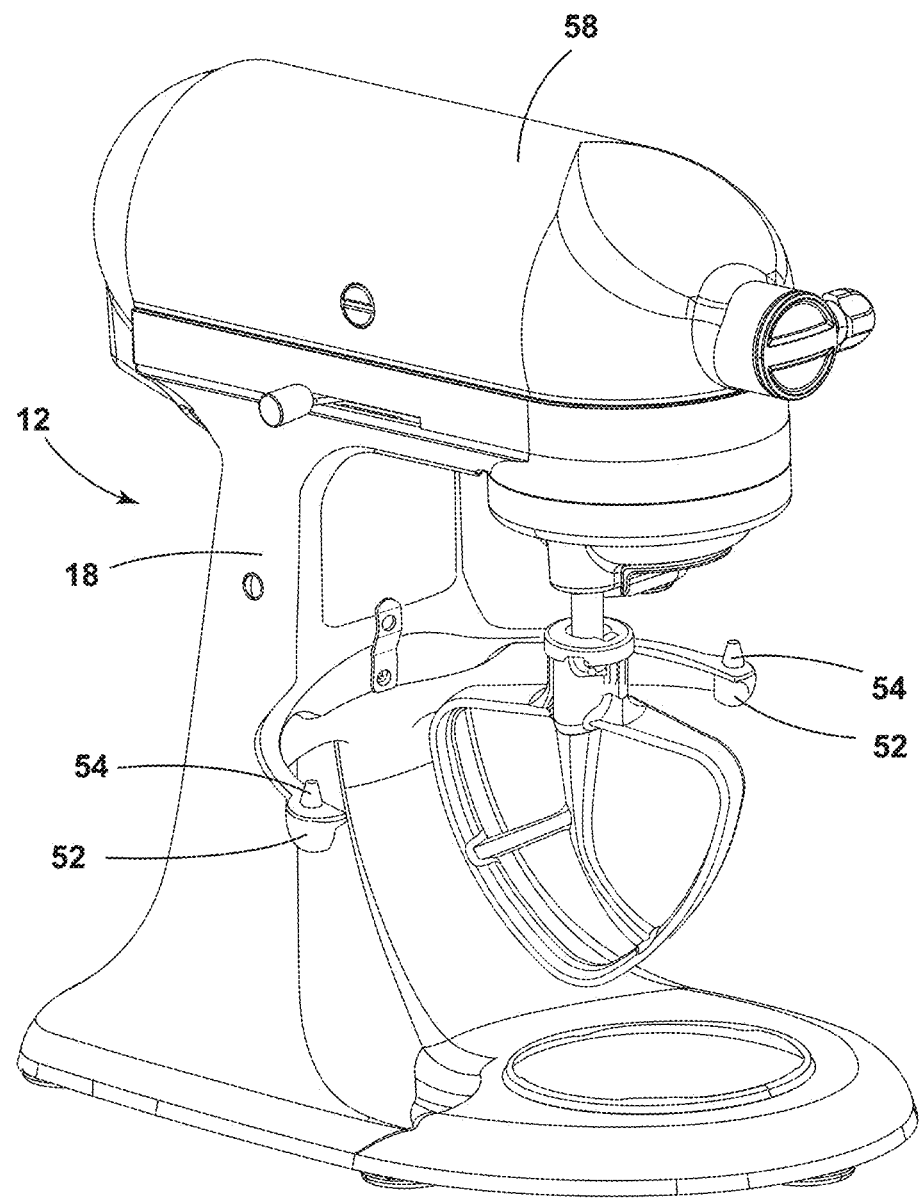
FIG. 4 is a font perspective view of an appliance of the present disclosure with attachment portions having projections.
Figure 5:
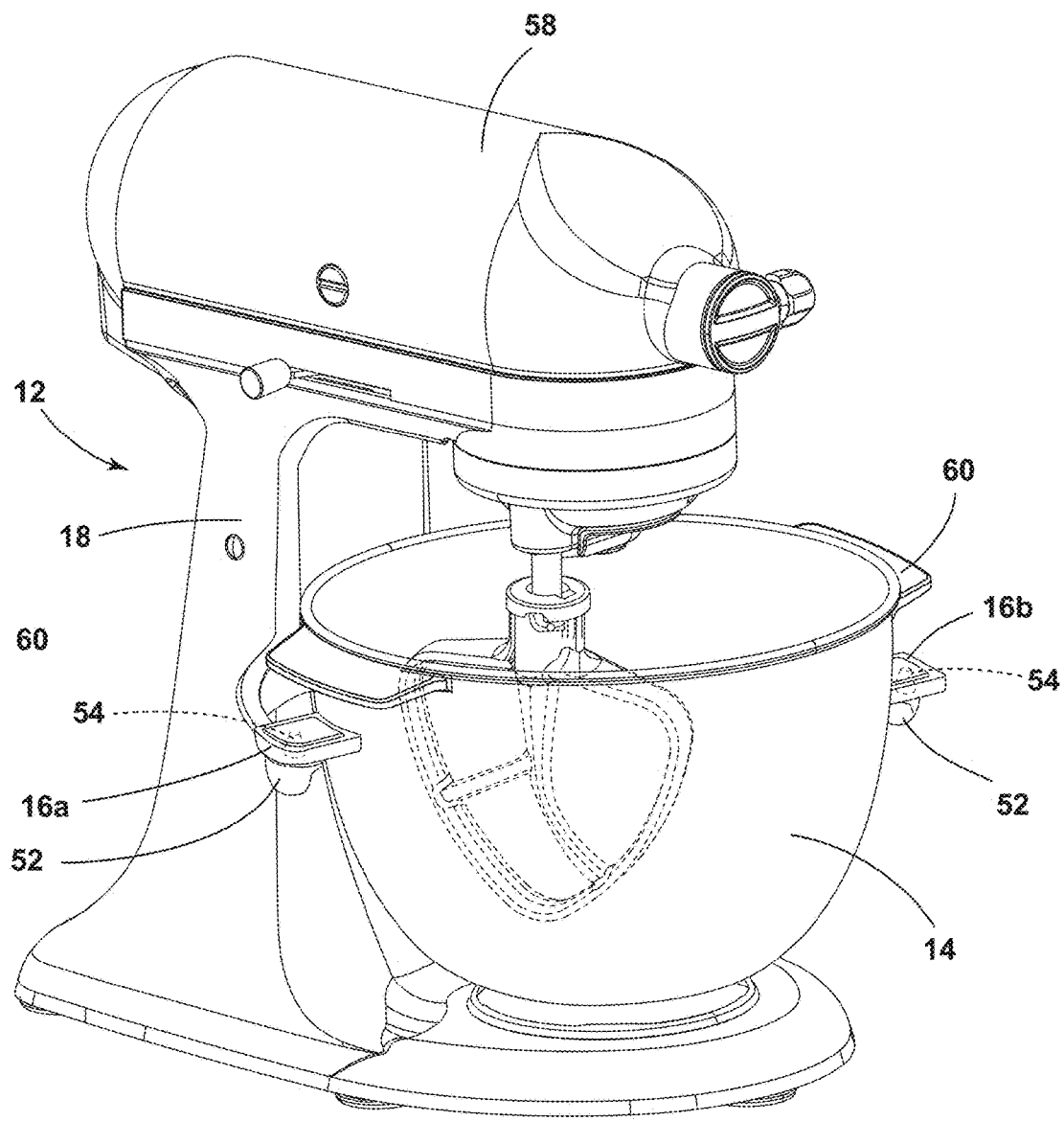
FIG. 5 is a front perspective view of the appliance of FIG. 4 with a bowl of the present disclosure coupled to the attachment portions via first and second attachment features.
Figure 6:
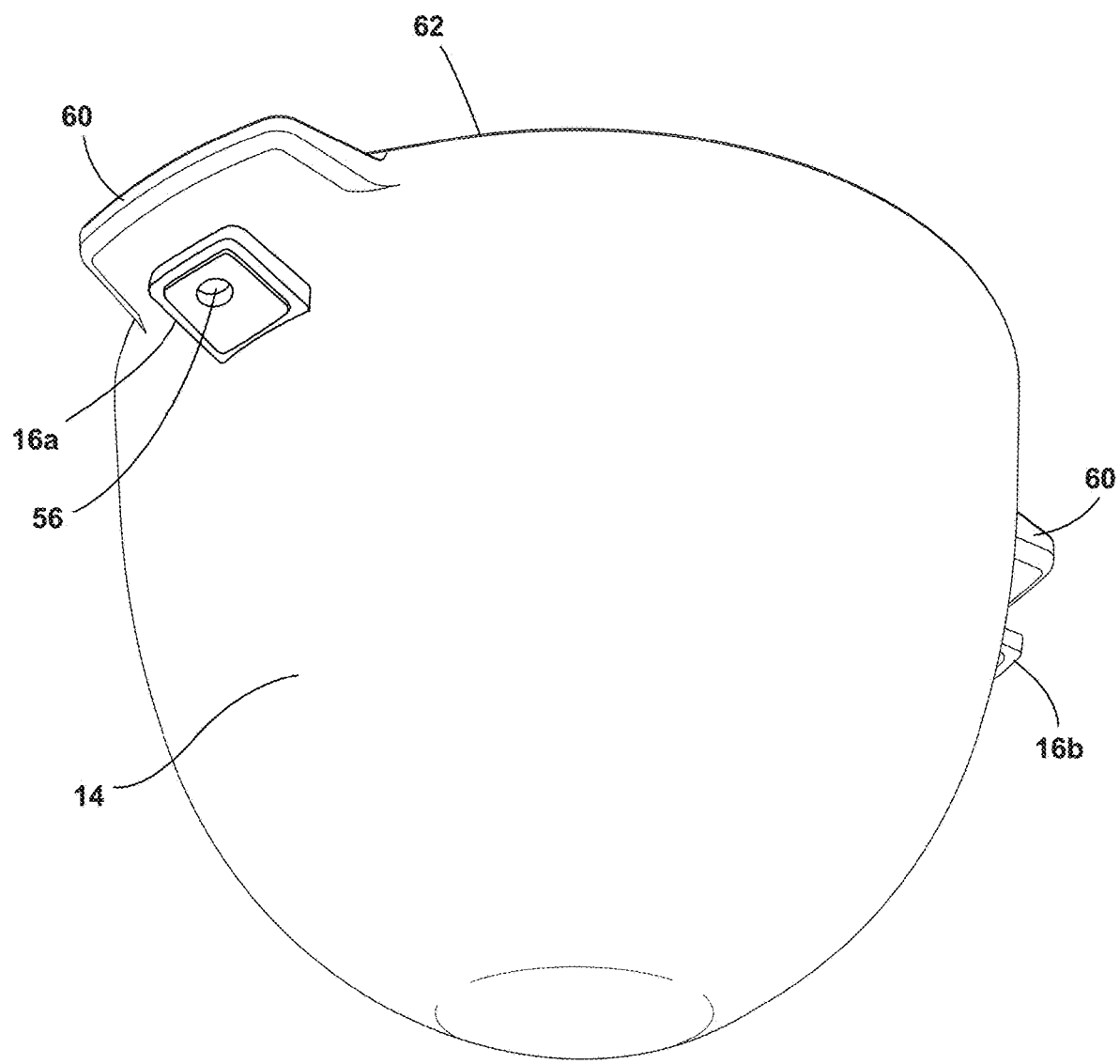
FIG. 6 is an enlarged partial bottom perspective view of an attachment feature of the present disclosure.

The base 38, as illustrated, can screw into the attachment portion 52 to fixedly couple the bowl 14 to the appliance 12. It is also contemplated that the base 38 may be designed with other attachment features configured to couple to the attachment portion 52 of the pedestal 50. Additionally or alternatively, the body 18 of the appliance 12 as illustrated in FIGS. 4 and 5 includes multiple attachment portions 52. For example, the attachment portions 52 are illustrated as each having a projection 54 extending upwardly from each respective attachment portion 52. In this configuration, the at least one attachment feature 16 includes a first attachment feature 16a and a second attachment feature 16b. Each of the first and second attachment features 16a, 16b define an aperture 56 in which the projection 54 of the respective attachment portion 52 may be disposed, as illustrated in FIG. 6.

With further reference to FIGS. 2-6, it is generally contemplated that the configuration of the appliance 12 as illustrated in FIG. 3 is a tilt-head stand mixer, such that a head 58 of the appliance 12 is tilted or otherwise articulated away from the bowl 14 to remove the bowl 14 and/or a mixing tool from the appliance 12. Additionally or alternatively, the appliance 12 illustrated with respect to FIGS. 4 and 5 is contemplated as a bowl-lift stand mixer. In this alternate configuration, the bowl 14 is disposed on the attachment portions 52. The user may articulate the attachment portions 52 and the bowl 14 upward toward the head 58 of the appliance 12 to execute a mixing function. The user may later adjust the bowl 14 in a downward direction to remove the bowl 14 from the attachment portions 52. The engagement between the attachment portion 52 of the appliance 12 and the at least one attachment feature 16 selectively yet securely couples the bowl 14 to the appliance 12 during mixing functions. Thus, the bowl 14 remains in a fixed position relative to the appliance 12 while ingredients are mixed within the bowl 14 by the appliance 12.

Referring still to FIGS. 2-6, the bowl 14 includes, in addition to the base 38, handles 60 that outwardly extend from the bowl 14 proximate to an upper edge 62 of the bowl 14. The handles 60 each have a first surface 64 and a second surface 66, such that the first surface 64 is generally smooth and coplanar with the upper edge 62 of the bowl 14. The second surface 66 may be referred to as an engagement surface, as a user typically engages the second surface 66 during the various articulations of the mixing bowl assembly 10. It is generally contemplated that the handles 60 may generally align with the first and second attachment features 16a, 16b in the configuration of the mixing bowl assembly 10 illustrated in FIG. 4.

Similarly, the lid 20 includes grasping portions 74 correspondingly configured with the handles 60 of the bowl 14. For example, each of the grasping portions 74 have the smooth first surface 64 and the second surface 66. As illustrated in FIG. 1, the second surface 66 of the grasping portions 74 and the handles 60, respectively, may generally face each other. Additionally or alternatively, the second surfaces 66 of the handles 60 and the grasping portions 74 may both be outwardly defined, such that the user may grasp the second surfaces 66 of both the handles 60 and the grasping portions 74 during articulation of the mixing bowl assembly 10.

With further reference to FIGS. 2-6, the handles 60 may each include detents 76 that are operably coupled with the respective grasping portion 74. For example, the handles 60 may include a first handle 60a and a second handle 60b, and the grasping portions 74 may include a first grasping portion 74a and a second grasping portion 74b. The detents 76 of the first handle 60a may be coupled with the first grasping portion 74a, and the detents 76 of the second handle 60b may be coupled with the second grasping portion 74b. The detents 76 may generally be configured to minimize rotation of the lid 20 relative to the bowl 14, such that the detents 76 may engage an outer ridge 70 of the grasping portions 74.

The grasping portions 74 outwardly extend from the outer circumferential frame 22 of the lid 20. As depicted in FIG. 1, the handles 60 of the bowl 14 and the grasping portions 74 of the lid 20 define a gap 78 when the lid 20 and the bowl 14 are coupled. The user may lift the bowl 14 off the lid 20 by reaching within the gap 78 to grasp the handles 60 once the baking process, described below, is complete. The gap 78 minimizes the risk of dropping the bowl 14 as the user removes it from the lid 20 as the user can obtain a firm grasp on the handles 60 before removal. In addition, the positioning of the grasping portions 74 outwardly extending from the outer circumferential frame 22 allows the user to reach beneath the grasping portions 74 to grasp both the handles 60 of the bowl 14 and the grasping portion 74 of the lid 20. Thus, the user may easily move the bowl 14 and the lid 20 in and out of the cooking appliance 48.

While the gap 78 may be defined between the handles 60 of the bowl 14 and the grasping portions 74 of the lid 20, it is contemplated that the configuration of the detents 76 with the grasping portions 74 may also be utilized. In this configuration, the detents 76 may extend from the handles 60 proximate to the upper and outside edges 62, 72 of the handles 60 and bowl 14, respectively. In this alternate configuration, the gap 78 may be defined while the detents 76 may still minimize rotation of the lid 20 relative to the bowl 14. The combination of the gap 78 to maximize the grip of the handles 60 and the grasping portions 74, respectively, as well as the anti-rotation configuration of the detents 76, may maximize the overall life of the mixing bowl assembly 10.

Figure 7:
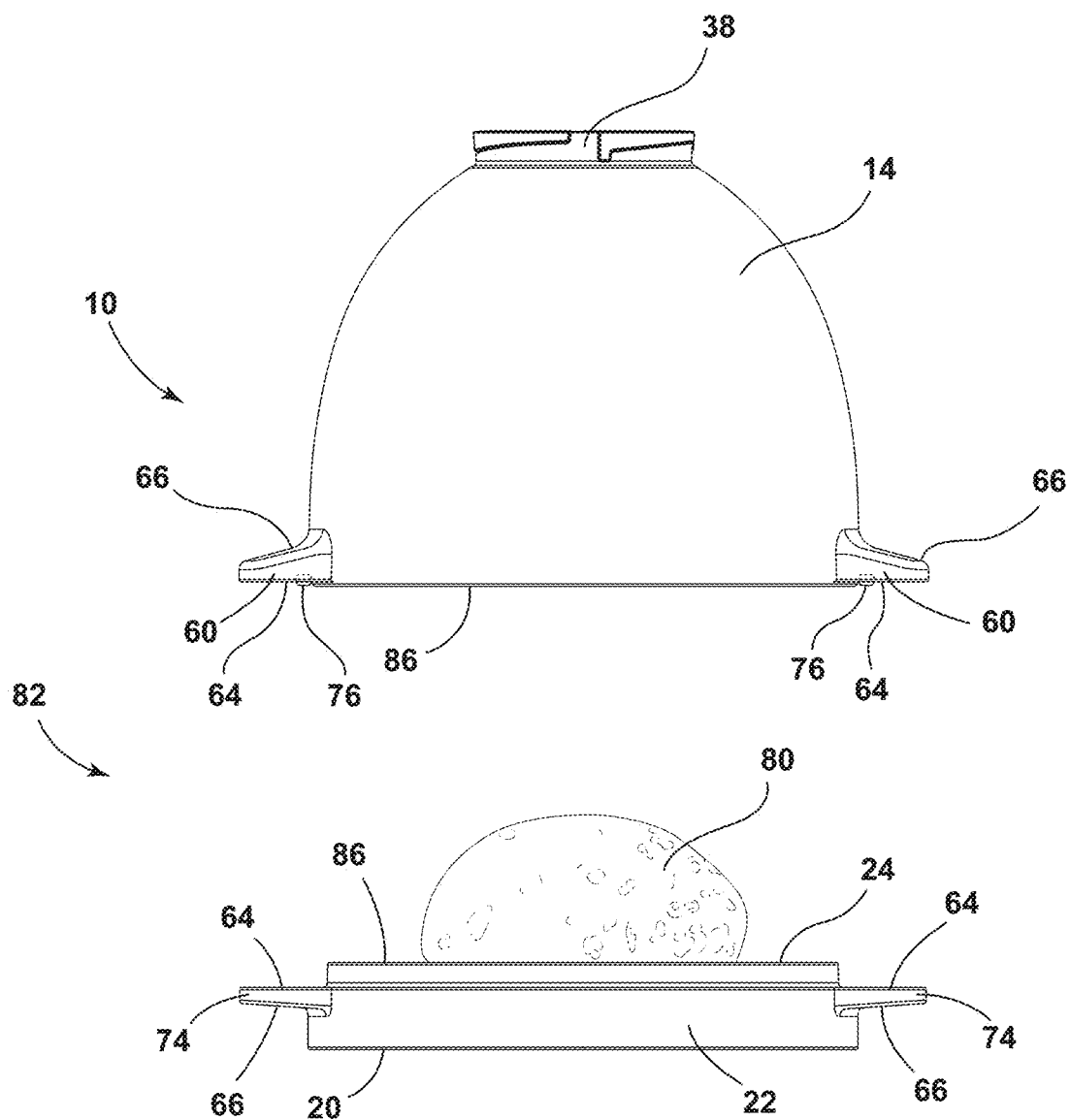
FIG. 7 is a front exploded elevational view of a bowl and a lid of the present disclosure with a food good disposed on the lid.
Figure 8:
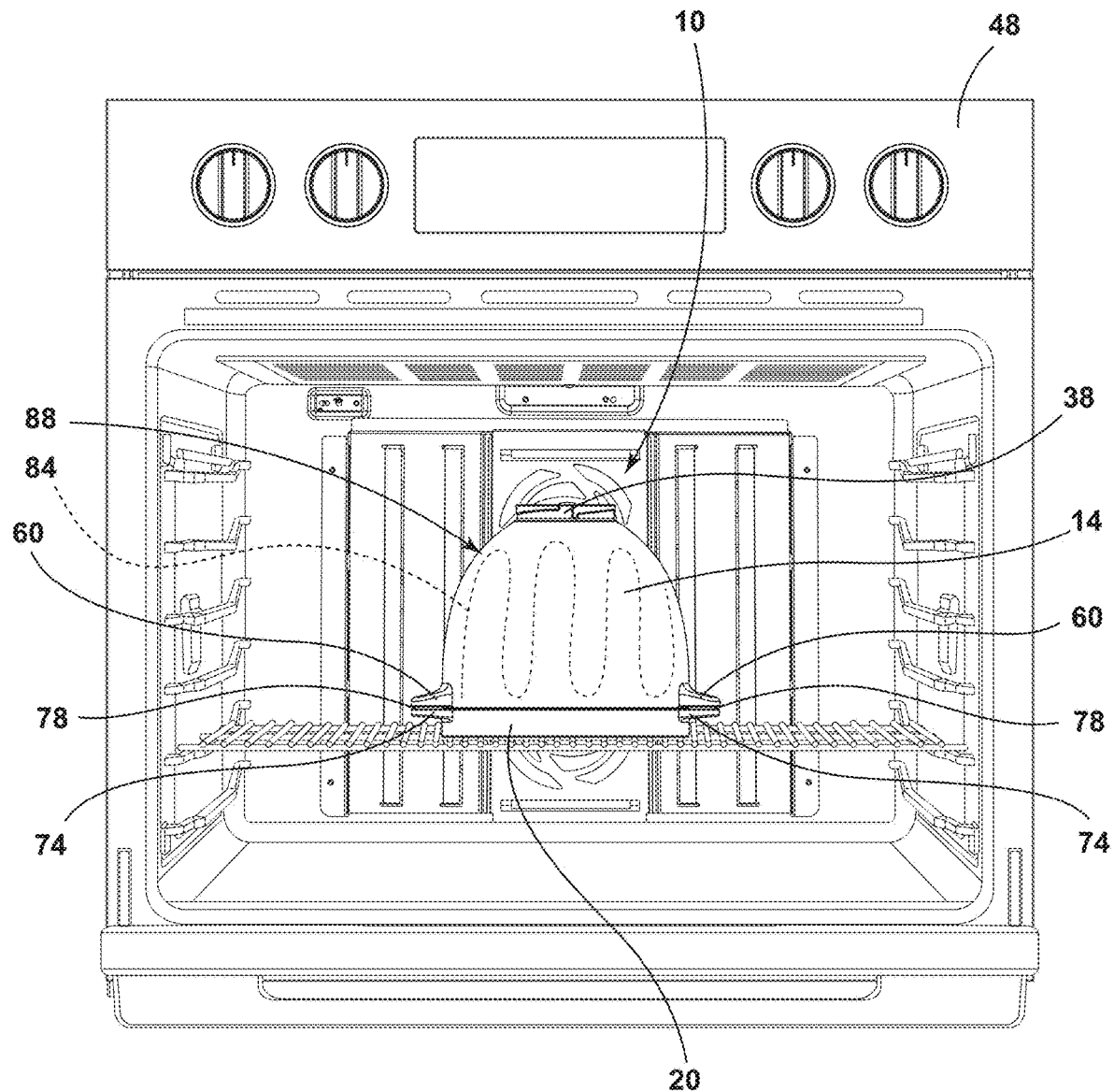
FIG. 8 is a front elevational view of a mixing bowl assembly of the present disclosure in an appliance.
Figure 9:
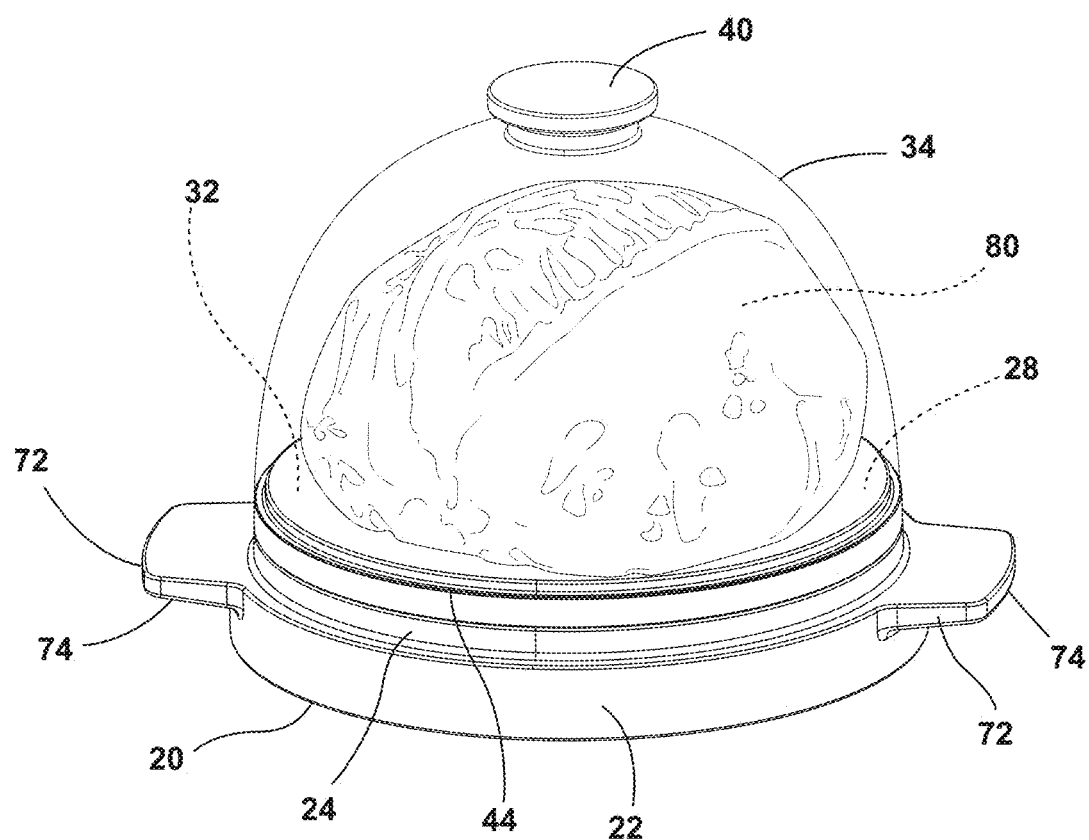
FIG. 9 is a top perspective view of a lid, a planar wooden trivet, and a glass dome of the present disclosure.

Referring now to FIGS. 7-9, the mixing bowl assembly 10 is generally used to form a food good 80, such that the food good 80 may be formed within the bowl 14 and served upon the planar wooden trivet 28 and the lid 20, as described in more detail below. By way of example, not limitation, the food good 80 is illustrated as a bread dough (FIG. 7) and a loaf of bread (FIG. 9). However, it is also contemplated that the food good 80 may also be any food good 80 that may utilize a proofing process, such as doughs containing yeast that rise over time. The proofing process is a process in which the food good 80 typically doubles in size, such that maintaining an airflow system during the proofing process helps maintain consistent and even growth of the food good 80.

Once combined in the bowl 14, the food good 80 is positioned on the depressed support surface 26 of the lid 20, and the bowl 14 is inverted into a proofing position 82 to cover the food good 80 to initiate the proofing process. As mentioned above, the yeast in the food good 80 is activated during the proofing process, such that fermentation begins. During proofing, the yeast begins to consume carbohydrates present in the food good 80 and expel carbon dioxide gas resulting in the expansion, or rise, of the food good 80. This process forms air pockets in the food good 80 that may be desired for the overall texture of the food good 80. Typically, the food good 80 is formed into the desired shape of the final food good 80 prior to proofing as, once the food good 80 has been proofed, minimal handling of the food good 80 is desired to minimize potential flattening of the food good 80.

With further reference to FIGS. 7-9, the bowl 14 is inverted and coupled to the lid 20 during the proofing process to define a controlled airflow system 84 between the bowl 14 and the lid 20. As mentioned above, the inner circumferential lip 24 of the lid 20 is disposed within the bowl 14 to define a mating engagement. Stated differently, the inner circumferential lip 24 is sized to engage the upper edge 62 of the bowl 14, such that movement of the lid 20 relative to the bowl 14 is significantly reduced. The mating engagement is further defined by the at least partial coupling of the grasping portions 74 with the handles 60, as set forth above. The upper edge 62 of the bowl 14 and the outer circumferential frame 22 each define a mating surface 86. During both the proofing and baking processes, the bowl 14 and the lid 20 are coupled, such that the respective mating surfaces 86 are engaged and the inner circumferential lip 24 is snug within the bowl 14. This arrangement defines the mating engagement between the lid 20 and the bowl 14, which defines and maintains the controlled airflow system 84 mentioned above.

The food good 80 is disposed on the depressed support surface 26 of the lid 20, which allows a user to transition from the proofing process to baking the food good 80 while simultaneously maintaining the controlled airflow system 84. For example, during the proofing process, the food good 80 releases moisture that is retained by the mating engagement of the bowl 14 and the lid 20. The moisture and air are trapped between the bowl 14 and the lid 20 to further define the controlled airflow system 84, which is beneficial for maintaining an even or consistent proofing and baking environment for the food good 80. Once the proofing process is complete, the user can transfer the food good 80 to the cooking appliance 48 to begin the baking process. It is generally contemplated that the mixing bowl assembly 10 transitions from the proofing position 82 to a baking position 88 upon placement of the mixing bowl assembly 10 in the cooking appliance 48.

As generally mentioned above, the environment in which the food good 80 is baked can be influenced by changes in humidity, slight variations in temperature, airflow, and other environmental factors that may result in changes to the food good 80. Thus, preserving the controlled airflow system 84 maintains the overall consistency of the food good 80, which can simplify the overall baking process by minimizing potential over or under baking. It is generally contemplated that the bowl 14 and the lid 20 can be formed from a glazed ceramic material that generally regulates the overall internal environment between the bowl 14 and the lid 20. It is also contemplated that the bowl 14 and the lid 20 may be formed from glass, glass-ceramic, cast iron, or other materials known in the art. It is generally contemplated that the material used to form the lid 20 minimizes sticking of the food good 80 along the depressed support surface 26, such that the food good 80 leaves minimal residue.

Figure 10:
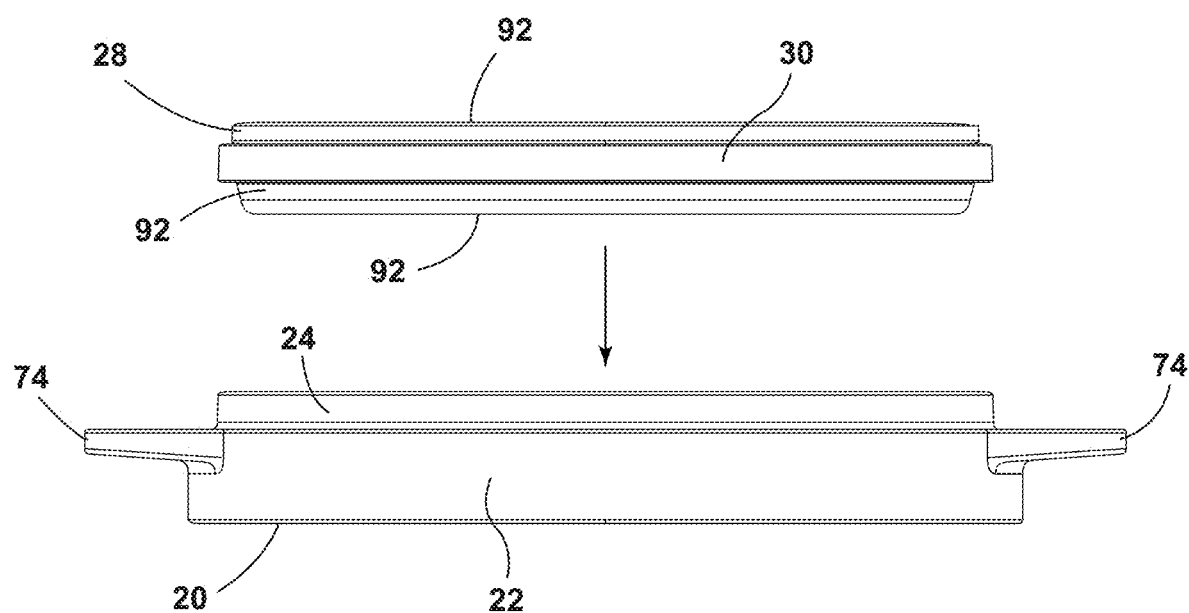
FIG. 10 is a side elevational view of the lid and the planar wooden trivet of FIG. 9.
Figure 11:
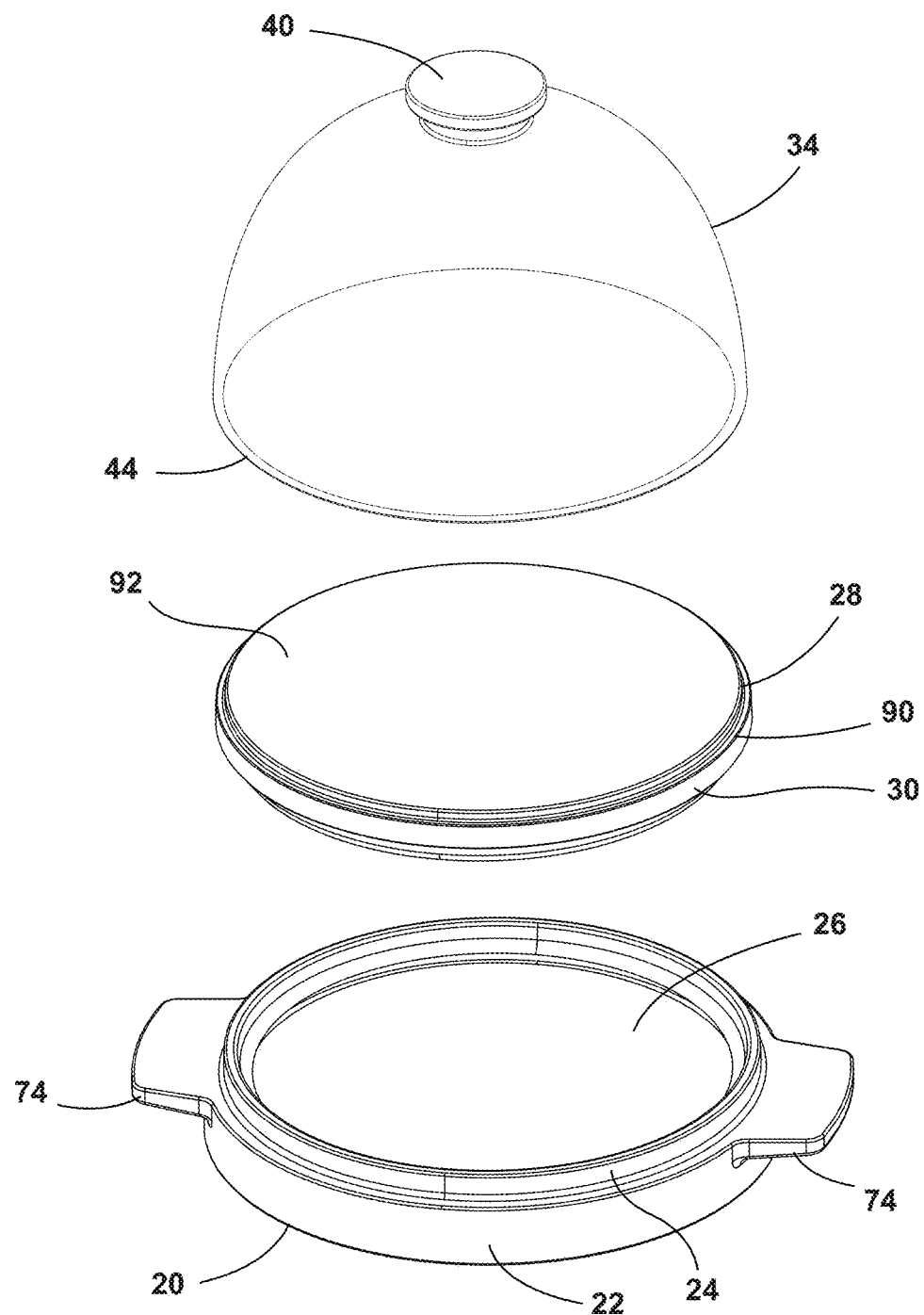
FIG. 11 is a top perspective exploded view of the lid, the planar wooden trivet, and the glass dome of FIG. 9.

Referring now to FIGS. 9-11 and as generally mentioned above, the outer circumferential frame 22 and the inner circumferential lip 24 of the lid 20 generally define the depressed support surface 26 on which the planar wooden trivet 28 is disposed. Specifically, the perimeter rim 30 of the planar wooden trivet 28 is configured to rest upon the inner circumferential lip 24 of the lid 20. It is generally contemplated that the perimeter rim 30 outwardly extends from a side 90 of the planar wooden trivet 28 and may extend circumferentially around the side 90. It is also contemplated that the perimeter rim 30 may extend from the side 90 of the planar wooden trivet 28 at various intervals along the side 90, such that one side of the planar wooden trivet 28 may be raised a greater height relative to the lid 20 while an opposing side of the planar wooden trivet 28 may be relatively closer to the inner circumferential lip 24 of the lid 20. Additionally or alternatively, the perimeter rim 30 may be segmented along the side 90 of the planar wooden trivet 28, such that the perimeter rim 30 engages with portions of the inner circumferential lip 24 of the lid 20. It is generally contemplated that the planar wooden trivet 28 is reversible, such that a serving surface 92 is defined as the exposed upward facing surface on which the food good 80 may be placed.

The lid 20 and the planar wooden trivet 28 may be used to serve the food good 80, such that the planar wooden trivet 28 may be disposed on the depressed support surface 26 of the lid 20 to define the serving position 32. As mentioned above, the planar wooden trivet 28 is reversible and selectively coupled to the lid 20. The serving surface 92 of the planar wooden trivet 28 is outwardly facing in the serving position 32, and the food good 80 can be disposed on the serving surface 92 of the planar wooden trivet 28 and is typically covered by the dome 34 to preserve the food good 80 when not in use.

The circumferential edge 44 of the dome 34 is coupled with the perimeter rim 30 in the serving position 32 of the planar wooden trivet 28. The user may utilize the dome 34 to maintain the overall freshness of the food good 80 by placing the dome 34 over the food good 80. The user may selectively remove the dome 34 via the handgrip 40. It is generally contemplated that the dome 34 may be formed from a glass material, such that the food good 80 may be at least partially visible within the dome 34. The glass dome 34 may be positioned on the planar wooden trivet 28 to cover the food good 80 in the serving position 32. The mixing bowl assembly 10 may be returned to the nested storage position 36 once the user is done with the food good 80. As mentioned above, the nested storage position 36 of the mixing bowl assembly 10 minimizes the overall space in which the mixing bowl assembly 10 may occupy during storage, such that the user may have access to additional storage as a result.

Referring again to FIGS. 1-11, the mixing bowl assembly 10 allows the user to maximize the use of the bowl 14 by utilizing the bowl 14 for mixing, proofing, and baking of the food good 80. The tight seal defined between the lid 20 and the bowl 14 maintains the controlled airflow system 84 between the bowl 14 and the lid 20 during proofing and baking. This allows a more consistent and even proof and bake of the food good 80. Thus, baking is made easier by minimizing the mixing, proofing, and baking vessels used while also maintaining the internal environment during the baking process that is established by proofing. This minimizes the time between proofing and baking, which may otherwise result in flattening of the food good 80.

Moreover, the lid 20 has further use as a support for the planar wooden trivet 28 when serving the food good 80. The planar wooden trivet 28 is reversible and either side may serve as the serving surface 92, maximizing the life of the planar wooden trivet 28. The glass dome 34 is selectively coupled to the perimeter rim 30 of the planar wooden trivet 28 to minimize air exposure of the food good 80 to ultimately preserve freshness. Further, the glass dome 34 and the planar wooden trivet 28 may nest within the bowl 14 beneath the lid 20 when not in use. The nested storage configuration 36 minimizes the space needed to store the mixing bowl assembly 10 and provides a clean and organized appearance.

The invention disclosed herein is further summarized in the following paragraphs and is further characterized by combinations of any and all of the various aspects described therein.

According to one aspect of the present disclosure, a mixing bowl assembly for an appliance includes a bowl that has at least one attachment feature and is configured to selectively couple to a body of said appliance via the at least one attachment feature. A lid is selectively and operably coupled to the bowl and includes an outer circumferential frame and an inner circumferential lip. The lid defines a depressed support surface that is proximate the inner circumferential lip. A planar wooden trivet has a perimeter rim that selectively engages the lid. The planar wooden trivet is selectively disposed on the depressed support surface of the lid in a serving position of the lid. A dome is selectively disposed within the bowl in a storage configuration. The dome is selectively coupled to the perimeter rim of the planar wooden trivet that is proximate the outer circumferential frame of the lid.

According to another aspect, at least one attachment feature defines a base of a bowl. According to another aspect, at least one attachment feature includes a first attachment feature and a second attachment feature. The first attachment feature and the second attachment feature are each configured to couple with projections that are defined by a body of said appliance.

According to another aspect, a serving position of a lid is further defined by a dome that is selectively coupled to a perimeter rim of a planar wooden trivet.

According to another aspect, a depressed support surface of a lid is configured to receive a food good in a proofing position and a baking position of a lid.

According to another aspect, an inner circumferential lip of a lid defines a mating engagement with a bowl in at least a baking position.

According to another aspect, a mating engagement is defined between a lid and a bowl further defines a controlled airflow system.

According to another aspect of the present disclosure, a mixing bowl assembly includes a bowl that has handles extending outwardly from the bowl. A lid is selectively coupled to the bowl. The lid includes an outer circumferential frame and grasping portions that extend outwardly from the outer circumferential frame. A planar trivet is selectively coupled with the lid, wherein the planar trivet defines at least a servicing position of the lid. A glass dome is selectively coupled to the planar trivet and includes a handgrip that is selectively disposed within the bowl.

According to another aspect, a planar trivet is comprised of wood.

According to another aspect, handles each define detents. The detents of handles are selectively coupled with grasping portions of a lid.

According to another aspect, a lid is coupled to a bowl and supports the bowl in a baking position.

According to another aspect, a controlled airflow system is defined between a bowl and a lid in a baking position.

According to another aspect, a glass dome, a planar wooden trivet, and a lid define a nested storage configuration when a handgrip of a glass dome is disposed within a bowl.

According to yet another aspect of the present disclosure, a mixing bowl assembly includes a bowl, and a lid that is operably coupled to the bowl and has an outer circumferential frame and an inner circumferential lip. The lid defines a depressed support surface that is proximate the inner circumferential lip. The mixing bowl assembly further includes a planar wooden trivet that has a perimeter rim that engages the inner circumferential lip of the lid. The planar wooden trivet is selectively disposed on the depressed support surface of the lid. A glass dome is selectively disposed within the bowl and has a handgrip. The glass dome is selectively coupled to the perimeter rim of the planar wooden trivet that is proximate to the outer circumferential frame of the lid.

According to another aspect, a bowl includes a first handle and a second handle, wherein the first handle and the second handle each define detents.

According to another aspect, a lid includes a first grasping portion and a second grasping portion. The first grasping portion and the second grasping portion engage the detents that are defined by a first handle and a second handle, respectively.

According to another aspect, a bowl includes a recessed base, wherein a handgrip of a glass dome is selectively disposed within the recessed base of the bowl in a nested storage position.

According to another aspect, a glass dome and a planar wooden trivet are disposed within a bowl and an outer circumferential frame of a lid is coupled to a bowl to define a nested storage position.

According to another aspect, a planar wooden trivet is coupled to a lid that defines a serving position.

According to another aspect, a serving position is further defined by a planar wooden trivet that is disposed on a depressed support surface of a lid and a perimeter rim of the planar wooden trivet is coupled to an inner circumferential lip of the lid.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mixing bowl assembly for an appliance, comprising:
    a bowl having at least one attachment feature and configured to selectively couple to a body of said appliance via the at least one attachment feature;
    a lid selectively and operably coupled to the bowl and including an outer circumferential frame and an inner circumferential lip, the lid defining a depressed support surface proximate the inner circumferential lip;
    a planar wooden trivet having a perimeter rim that selectively engages the lid, wherein the planar wooden trivet is selectively disposed on the depressed support surface of the lid in a serving position of the lid; and
    a dome selectively disposed within the bowl in a storage configuration, the dome being selectively coupled to the perimeter rim of the planar wooden trivet proximate the outer circumferential frame of the lid.

2. The mixing bowl assembly of claim 1, wherein the at least one attachment feature defines a base of the bowl.

3. The mixing bowl assembly of claim 1, wherein the at least one attachment feature includes a first attachment feature and a second attachment feature, and wherein the first attachment feature and the second attachment feature are each configured to couple with projections defined by the body of said appliance.

4. The mixing bowl assembly of claim 1, wherein the serving position of the lid is further defined by the dome being selectively coupled to the perimeter rim of the planar wooden trivet.

5. The mixing bowl assembly of claim 1, wherein the depressed support surface of the lid is configured to receive a food good in a proofing position and a baking position of the lid.

6. The mixing bowl assembly of claim 5, wherein the inner circumferential lip of the lid defines a mating engagement with the bowl in at least the baking position.

7. The mixing bowl assembly of claim 6, wherein the mating engagement defined between the lid and the bowl further defines a controlled airflow system.

8. A mixing bowl assembly, comprising:
    a bowl including handles extending outwardly from the bowl;
    a lid selectively coupled to the bowl, the lid including an outer circumferential frame and grasping portions extending outwardly from the outer circumferential frame;
    a planar trivet selectively coupled with the lid, wherein the planar trivet defines at least a serving position of the lid; and
    a glass dome selectively coupled to the planar trivet, the glass dome including a handgrip selectively disposed within the bowl.

9. The mixing bowl assembly of claim 8, wherein the planar trivet is comprised of wood.

10. The mixing bowl assembly of claim 9, wherein the handles each define detents, and wherein the detents of the handles are selectively coupled with the grasping portions of the lid.

11. The mixing bowl assembly of claim 8, wherein the lid is coupled to the bowl and supports the bowl in a baking position.

12. The mixing bowl assembly of claim 11, wherein a controlled airflow system is defined between the bowl and the lid in the baking position.

13. The mixing bowl assembly of claim 8, wherein the glass dome, the planar wooden trivet, and the lid define a nested storage configuration when the handgrip of the glass dome is disposed within the bowl.

14. A mixing bowl assembly, comprising:
- a bowl;
- a lid operably coupled to the bowl and having an outer circumferential frame and an inner circumferential lip, the lid defining a depressed support surface proximate the inner circumferential lip;
- a planar wooden trivet having a perimeter rim that engages the inner circumferential lip of the lid, the planar wooden trivet selectively disposed on the depressed support surface of the lid; and
- a glass dome selectively disposed within the bowl and having a handgrip, the glass dome being selectively coupled to the perimeter rim of the planar wooden trivet proximate to the outer circumferential frame of the lid.

15. The mixing bowl assembly of claim 14, wherein the bowl includes a first handle and a second handle, and wherein the first handle and the second handle each define detents.

16. The mixing bowl assembly of claim 15, wherein the lid includes a first grasping portion and a second grasping portion, and wherein the first grasping portion and the second grasping portion engage the detents defined by each of the first handle and the second handle, respectively.

17. The mixing bowl assembly of claim 14, wherein the bowl includes a recessed base, and wherein the handgrip of the glass dome is selectively disposed within the recessed base of the bowl in a nested storage position.

18. The mixing bowl assembly of claim 17, wherein the glass dome and the planar wooden trivet are disposed within the bowl and the outer circumferential frame of the lid is coupled to the bowl to define the nested storage position.

19. The mixing bowl assembly of claim 14, wherein the planar wooden trivet is coupled to the lid to define a serving position.

20. The mixing bowl assembly of claim 19, wherein the serving position is further defined by the planar wooden trivet being disposed on the depressed support surface of the lid and the perimeter rim of the planar wooden trivet being coupled to the inner circumferential lip of the lid.

* * * * *